United States Patent

[11] 3,609,402

[72] Inventors Armand P. Ferro
Troy;
William P. Kornrumpf, Schenectady, both of N.Y.
[21] Appl. No. 873,561
[22] Filed Nov. 3, 1969
[45] Patented Sept. 28, 1971
[73] Assignee General Electric Company

[54] MONOSTABLE MULTIVIBRATOR WITH DUAL FUNCTION COMMUTATION AND TIMING CAPACITOR
7 Claims, 3 Drawing Figs.

[52] U.S. Cl. .......... 307/252 M, 307/273, 307/293, 307/305, 307/317
[51] Int. Cl. .......... H03k 17/00
[50] Field of Search .......... 307/252.55, 252.53, 273, 305, 293, 317

[56] References Cited
UNITED STATES PATENTS

| | | | |
|---|---|---|---|
| 3,295,421 | 1/1967 | McCormick .......... | 307/252 |
| 3,435,299 | 3/1969 | Schwartz .......... | 307/273 |
| 3,458,730 | 7/1969 | Gamblin .......... | 307/252 |

*Primary Examiner*—Donald D. Forrer
*Assistant Examiner*—David M. Carter
*Attorneys*—John F. Ahern, Paul A. Frank, Donald R. Campbell, Frank L. Neuhauser, Oscar B. Waddell and Joseph B. Forman

ABSTRACT: A two-thyristor capacitor-commutated multivibrator exhibiting monostable behavior is characterized by a voltage-sensitive gating circuit including a breakover switching device responsive to the commutating capacitor voltage. After a predetermined time delay the auxiliary thyristor fires to commutate off the load thyristor.

PATENTED SEP 28 1971 3,609,402

Inventors:
Armand P. Ferro,
William P. Kornrumpf,
by [signature]
Their Attorney.

Inventors:
Armand P. Ferro,
William P. Kornrumpf,
by [signature]
Their Attorney.

MONOSTABLE MULTIVIBRATOR WITH DUAL FUNCTION COMMUTATION AND TIMING CAPACITOR

This invention relates to a solid-state monostable multivibrator circuit, and more particularly to a low-cost monostable multivibrator for generating timed power pulses in which a commutating capacitor is utilized for the timing function.

In many power applications specific pulses of power are required, often modulated as to either pulse width or pulse frequency, to supply a load with the desired voltage or current. In the pulse width modulation mode only the pulse width is varied to achieve control of the power supplied to the load, whereas in the pulse frequency modulation mode the pulse width remains constant and the frequency of the pluses is changed. Monostable multivibrators, also called one-shot multivibrators, are useful for generating timed power pulses and have been designed in a variety of circuit configurations. Most monostable circuits employing thyristors as the power-handling devices use auxiliary timing circuits which are independent of the power devices and commutating circuitry for determining the length of conduction of the load current carrying thyristor and hence the pulse width. The monostable circuit to be described eliminates the need for such an external timing circuit. It is similar in configuration to the basic capacitor-commutated bistable multivibrator employing two silicon-controlled rectifiers discussed on page 153 et seq. of the Silicon Controlled Rectifier Manual, 4th Edition, copyright 1967, available from the Semiconductor Products Department, General Electric Company, Electronics Park, Syracuse, New York. The bistable operation is obtained by charging the commutating capacitor to opposite polarity as each thyristor is conductive in turn, and connecting the charged commutating capacitor across the load terminals of the then conducting thyristor by turning on the nonconducting thyristor. It has not heretofore been recognized, however, that a circuit of this general type can be simplified and exhibit monostable behavior by incorporating internal timing.

Accordingly, an object of the invention is to provide a low-cost monostable multivibrator capable of operating at power levels characterized charging a dual function capacitor to fulfill both the load current commutation and monostable timing functions.

Another object is the provision of such a monostable multivibrator using thyristor solid-state switching devices that is inherently simple, requires only one power device and zero standby current, and operates efficiently with both resistive and inductive loads.

In accordance with the invention, a monostable multivibrator comprises a load current carrying solid-state switching device adapted to be connected in series circuit relationship with a load between a pair of power supply terminals; a commutating capacitor connected to the junction therebetween and to the junction of an auxiliary solid-state switching device and a resistor also connected in series between the power supply terminals; and pulse-generating means for rendering conductive the load current carrying solid-state switching device at desired intervals to supply load current while simultaneously charging the commutating capacitor. This multivibrator structure is characterized by voltage-sensitive gating means responsive to the voltage across the charging commutating capacitor, and preferably including a voltage-sensitive breakover switching device, for rendering conductive the auxiliary solid-state switching device after a predetermined time delay to thereby initiate commutation of the load current carrying solid-state switching device.

The foregoing and other objects, features, and advantages of the invention will be apparent from the following more particular description of the several preferred embodiments of the invention illustrated in the accompanying drawings wherein.

Figure 1:
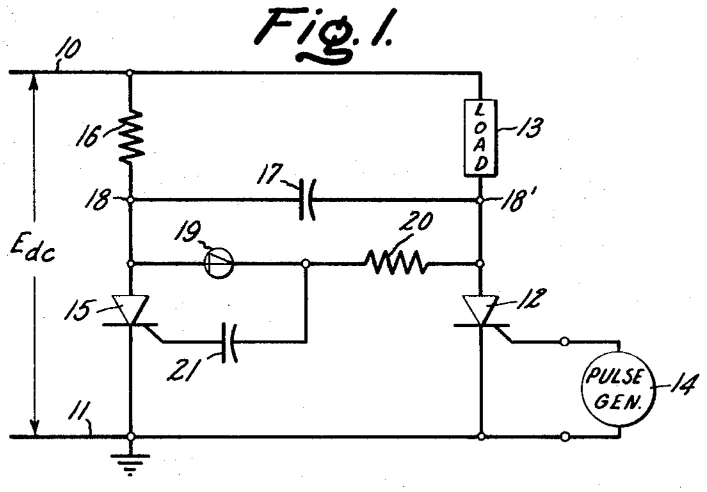
FIG. 1 is a detailed circuit diagram of a monostable multivibrator constructed in accordance with the teaching of the invention.

Referring to FIG. 1, the circuit input terminals 10 and 11 are connected across a suitable source of unidirectional electric potential $E_{dc}$, and negative supply terminal 11 conveniently is connected to ground. The monostable multivibrator comprises a load current carrying solid-state switching device 12 connected in series circuit relationship with a load 13 between supply terminals 10 and 11. The solid-state switching device 12 is a unidirectional conducting power thyristor such as the silicon controlled rectifier, or a bidirectional conducting power thyristor such as the triac or diac used in the unidirectional mode, but can also be any other suitable power semiconductor as, for example, a four-layer breakdown diode or a pair of transistors connected in inverse-parallel to achieve thyristor characteristics. It is preferred, however, that the solid-state switching device 12 be a silicon-controlled rectifier. A pulse generator 14 connected between the gate electrode and cathode of SCR 12 generates a train of pulses having an appropriate magnitude and polarity to render the switching device conductive at the desired frequency. As is well known, the silicon controlled rectifier is a reverse-blocking triode thyristor that is switched from a high impedance blocking state to a low impedance conducting condition, assuming that the anode electrode is positive with respect to the cathode electrode, by the application of a gating pulse to the gate electrode. Thereafter the gate electrode loses control of the device and in order to commutate it off or return it to its reverse-blocking high impedance state, it is necessary to make the anode electrode negative with respect to the cathode or to reduce the current through the device to a value below the holding current. Further information on a suitable gating pulse generator 14 that can be used, as well as about the SCR and the other solid-state switching devices that have been mentioned, can be obtained from the aforementioned SCR Manual. Although not here illustrated, an RC snubbing circuit can be connected across the load terminals of SCR 12 to limit the rate of rise of forward voltage upon the application of supply voltage to the device, to reduce the possibility of dv/dt firing.

Load 13 is a resistive or inductive load, since the manner of operation and efficiency of the circuit are independent of the character of the load. A feedback or coasting diode required for an inductive load is not shown. The monostable multivibrator further comprises an auxiliary solid-state switching device 15 connected in series with a resistor 16 between supply terminals 10 and 11. A commutation capacitor 17 is connected directly between junction point 18 between auxiliary solid-state switching device 15 and resistor 16, and junction point 18' between main SCR 12 and the load 13. Auxiliary solid-state switching device 15 need not be a power level device since, as will be clarified later, it conducts only during the commutation intervals of load current carrying switching device 12 and has a lower current rating. Although switching device 15 is preferably a thyristor, in particular a silicon-controlled rectifier, other types of signal level semiconductors can be used if desired, as previously discussed.

Before proceeding to a discussion of the remainder of the circuit, it will be helpful to review the basic operation of the commutation circuit for main load current carrying SCR 12. Upon supplying a gating pulse to the gate electrode of SCR 12 from pulse generator 14, SCR 12 is triggered into conduction and supplied load current to the load 13. At the same time, commutating capacitor 17 begins to charge through resistor 16 with a polarity such that terminal 18 is positive with respect to terminal 18'. After the desired period of conduction, load current is terminated by rendering conductive auxiliary SCR 15 to thereby effectively couple the charged commutating capacitor 17 across the load terminals of main SCR 12. Load current is diverted to the negatively charged terminal of commutating capacitor 17 for an interval longer than the turnoff time of SCR 12, and main SCR 12 begins to commutate off.

According to the teaching of the invention, the voltage across commutating capacitor 17 is also used for the fundamental timing function of the monostable multivibrator by determining the duration of the output pulse to load 13. That is, commutation capacitor 17 acts in a dual function of a timing capacitor to initiate the gating a auxiliary SCR 15 to commutate off main SCR 12 after a predetermined time delay. The timing circuit comprises the series combination of resistor 16 and capacitor 17 whose values are chosen to give the desired RC time constant. Commutating capacitor 17 can be varied to change the time delay and thus the width of the output pulse with the restriction that it must be large enough to provide reverse load current for a time sufficient to commutate off main load current carrying SCR 12. By choosing a high enough value for resistor 16, the current through auxiliary SCR 15 following firing of the device and discharge of commutating capacitor 17 will be below the holding current, so that it is then not necessary to provide a special commutation circuit for auxiliary SCR 15. Within this limitation the magnitude of resistor 16 can also be changed to adjust the length of the time delay.

To make provision for internal timing, a voltage-sensitive gating circuit responsive to the voltage across commutating capacitor 17 is used to generate a gating signal for auxiliary SCR 15. In the preferred embodiment, the voltage-sensitive gating circuit comprises the series combination of a voltage-sensitive switching device 19 and resistor 20 connected directly across commutating capacitor terminals 18 and 18′. The junction of voltage-sensitive switching device 19 and resistor 20 is coupled through a coupling capacitor 21 to the gate electrode of auxiliary SCR 15. Voltage-sensitive switching device 19 is preferably a solid-state voltage-sensitive breakover type of switching device such as, for example, a silicon unilateral switch, a silicon-controlled switch, a four-layer diode, a Zener diode, or a bidirectional device such as the silicon bilateral switch used in the unidirectional mode. In this circuit, device 19 is a silicon unilateral switch (SUS). The silicon unilateral switch is a silicon planar, monolithic integrated circuit having thyristor electrical characteristics closely approximating those of an "ideal" four-layer diode, and a gate lead provided to eliminate rate effect, obtain triggering at low voltages, and to obtain transient-free waveforms is not used for this application. The device is designed to switch from a very high to a very low impedance state when a voltage applied across the anode and cathode electrodes exceeds a predetermined threshold signal level voltage. A suitable silicon unilateral switch that can be used is identified as the GE-D13D1, and is further described on pages 80 and 81 of the SCR Manual. Since the silicon bilateral switch is essentially two identical SUS structures arranged in inverse-parallel, and thus operates as a switch with both polarities of applied voltage, this device can also be used in the circuit to the same effect.

The operation of the monostable multivibrator circuit is as follows. In the rest or "off" condition of the circuit with both main SCR 12 and auxiliary SCR 15 turned off and in their high-impedance state, the circuit draws zero standby current with the exception of a small amount of leakage current through the thyristors. The application of an input signal from pulse generator 14 to the gate electrode of main SCR 12 renders this thyristor conductive and initiates the flow of load current through load 13. Since at this time there is no charge on the commutating capacitor 17, both points 18 and 18′ are reduced to ground potential when SCR 12 starts to conduct. The potential at point 18′ is maintained at ground by the conducting SCR 12, but the voltage at point 18 increases exponentially toward the value of the supply voltage $E_{dc}$ at a rate dependent upon the RC time constant of resistor 16 and commutating capacitor 17, When commutating capacitor 17 changes to a voltage exceeding the threshold or switching voltages $V_s$ of silicon unilateral switch 19, device 19 switches from the high-impedance state to the conducting low-impedance state. The full value of the commutating capacitor voltage is immediately applied across resistor 20, and is further coupled through coupling capacitor 21 to the gate electrode of auxiliary SCR 15, rendering it conductive. Commutation capacitor 17 is thus effectively connected across the load terminals of load current carrying SCR 12, and commutates it off in the manner previously explained. More particularly, the turning on of auxiliary SCR 15 drives point 18 to ground potential, and since at this time there is a voltage $V_s$ across commutating capacitor 17, the potential at point 18′ changes from ground to $-V_s$. The load current flowing through load 13 is consequently diverted from SCR 12 ro commutating capacitor 17 for a sufficient time to allow SCR 12 to be commutated off. The resistance of resistor 16 is sufficiently high so that the current through auxiliary SCR 15 at this time is less than the holding current and cannot maintain conduction of the thyristor as the potential at point 18 begins to rise above ground potential. Therefore auxiliary SCR 15 is rendered nonconductive, and silicon unilateral switch 19 by this time has also been commutated off in the same manner. The circuit is now returned to the rest condition and remains in the rest condition until the application of the next pulse from pulse generator 14 to the gate of main SCR 12.

By changing the time constant of the series RC circuit comprising resistor 16 and commutating capacitor 17, the time delay of the circuit and hence the width of the output pulse is varied. The possible frequency range is very wide, limited only by the size of the RC components at the low end and the turnoff times of the thyristors at the high end. By way of example, the period of the output pulse can be tens of seconds or more long, or tenths of a millisecond with a duty cycle of 50 percent using SCR's presently available operating at a frequency of 3 kHz. In an actual circuit, using a fixed set of components and operating the frequency modulation mode, the RMS or average power output can be controlled by varying the frequency of the input pulses. The output power can also be controlled by using an adjustable resistor 16, or by energizing resistor 16 from a controlled voltage source independent of the supply voltage, to thereby modulate the pulse width, the frequency remaining constant.

Figure 2:
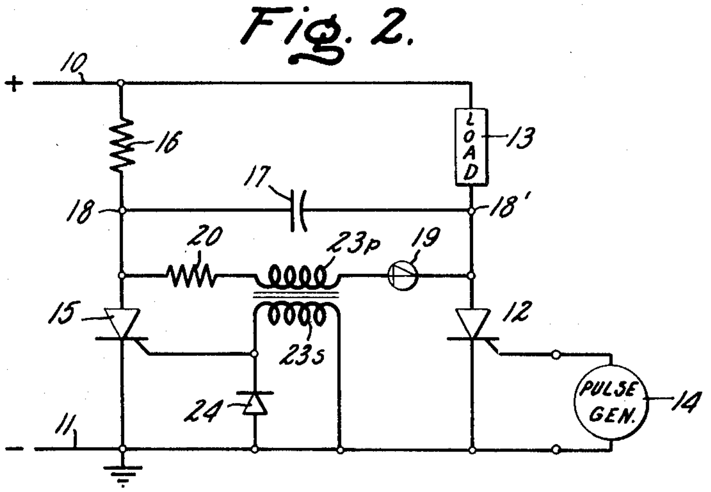
FIG. 2 is a modification of FIG. 1 showing a voltage-sensitive gating circuit for the auxiliary thyristor that uses a pulse transformer.
Figure 3:
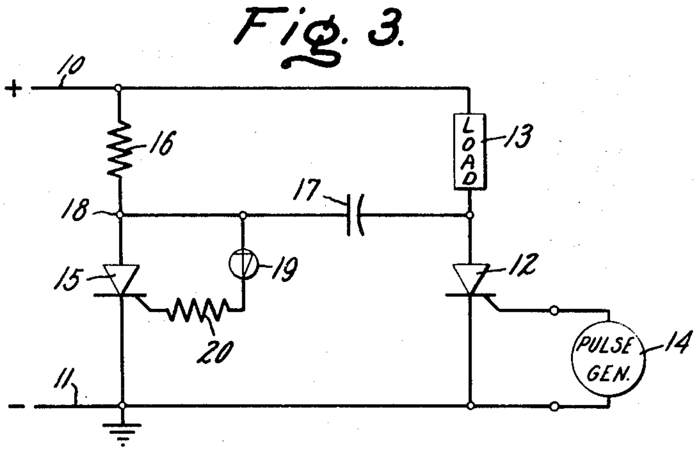
FIG. 3 is another modification of FIG. 1 employing a simplified voltage-sensitive gating circuit.

Other arrangements for the voltage-sensitive gating circuit for auxiliary SCR 15 are illustrated in FIGS. 2 and 3, and are typical of the equivalent circuits that can be used within the scope of the invention. In FIG. 2 the voltage-sensitive gating circuit includes a pulse transformer having a secondary winding 23*s* connected across the cathode-gate of auxiliary SCR 15. Diode 24 is provided to reset the transformer flux. The primary winding 23*p* is then connected in series circuit relationship with silicon unilateral switch 19 and resistor 20, this series circuit in turn being directly connected across the terminals of commutating capacitor 17. In this circuit the cathode of device 19 is connected to terminal 18′, this arrangement being equivalent to that shown in FIG. 1 where the position of the device is reversed and the anode connected to terminal 18. When silicon unilateral switch 19 breaks over and conducts, the pulse transformer, of course, couples the gating pulse to the gate electrode of auxiliary SCR 15, rendering it conductive. The simplified version of the voltage-sensitive gating circuit in FIG. 3 comprises simply the silicon unilateral switch 19 connected in series with resistor 20 between capacitor terminal 18 and the gate electrode of thyristor 15. The values of resistors 16 and 20 are selected to limit the current and voltage in the quiescent condition to prevent spurious firing.

Figure 4:
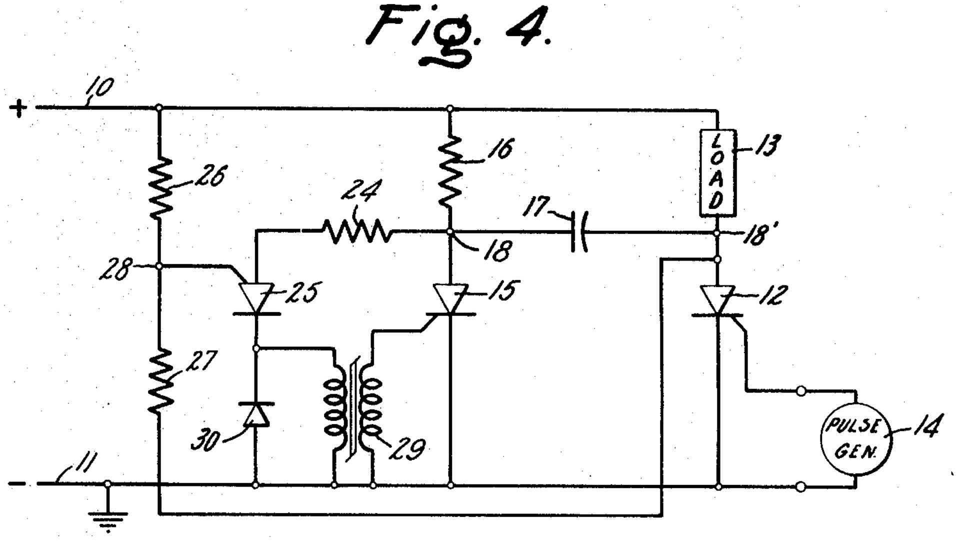
FIGS. 4 and 5 are detailed circuit diagrams of embodiments of the invention suitable for generating higher voltage pulses.
Figure 5:
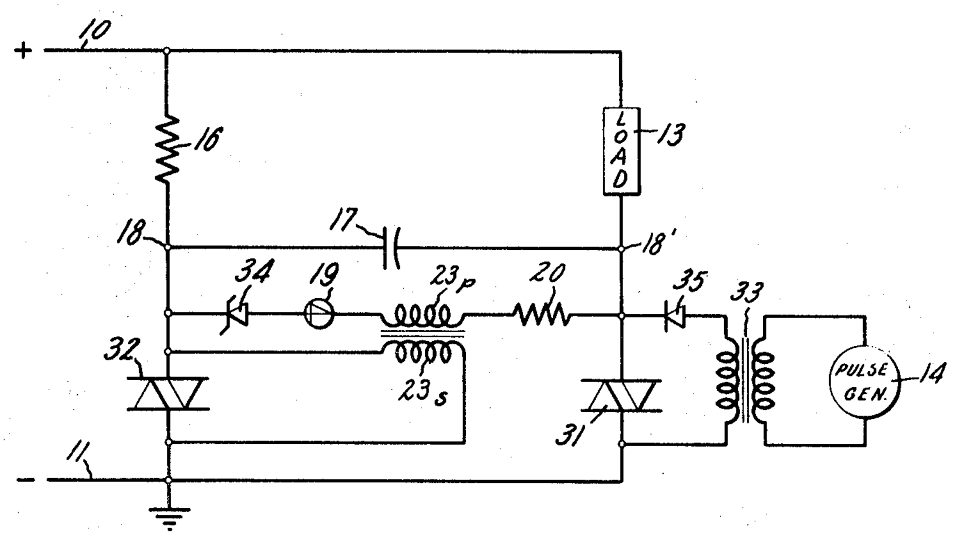

The monostable multivibrators illustrated in FIGS. 4 and 5 are suitable for the generation of higher voltage pulses. The FIG. 4 circuit has the basic multivibrator components of FIG. 1 but employs a current-limiting resistor 24 connected to junction point 18 to reduce the magnitude of the capacitor current to a level more suitable for the voltage-sensitive gating circuit of the auxiliary switching device. The other end of limiting resistor 24 is coupled to the anode of an anode-gated SCR 25. This thyristorstype solid-state switching device, as the name implies, has essentially the four-layer semiconductor structure of the ordinary silicon controlled rectifier, but the gate electrode is connected to the intermediate layer adjacent the anode rather than to the intermediate layer adjacent the cathode. The device is rendered conductive by forward biasing the diode junction between the anode and the anode-gate. The silicon controlled switch has an equivalent type of structure, and the silicon unilateral switch can also be fired in this manner by using the gate electrode. To provide a reference voltage for the anode-gate of device 25, a voltage divider comprising series resistors 26 and 27 is connected between supply terminal 10 and junction 18′, and the junction 28 of the voltage divider is coupled to the gate electrode. A saturable transformer 29 couples the gating pulse produced to the cathode-gate circuit of auxiliary thyristor 15 and provides the appropriate voltage level transformation of the capacitor voltage. In operation, when the voltage on charging commutation capacitor 17 exceeds the reference voltage of the anode gate of device 25 by a predetermined amount, anode-gated SCR 25 is rendered conductive. The voltage on capacitor 17 is applied across the primary winding of nonlinear pulse transformer 29, which after a predetermined time is driven into saturation and develops a gating level pulse effective to turn on auxiliary SCR 15. Diode 30 resets the flux in nonlinear pulse transformer 29 after each gating pulse. To modulate the width of the power pulse supplied to load 13, the reference voltage for device 25 produced at junction point 28 of the voltage divider can be made adjustable by varying the ration between resistors 26 and 27.

The alternate circuit of FIG. 5 for the generation of high-voltage power pulses is similar to FIG. 2 but uses diac solid-state switching devices 31 and 32 in place of SCR's 12 and 15. The diac is a bidirectional conducting diode thyristor that has no gate electrode and is rendered conductive by applying across the load electrodes a voltage in excess of the switching voltage. In this application, of course, the diac is used in a mode in which it conducts unidirectionally. To increase the voltage level of the input signal from pulse generator 14, a transformer 33 is utilized having one winding connected directly across the load electrodes of load current directly across the load electrodes of load current carrying 119of 31. Diode 35 prevents saturation of transformer 33 by the load voltage. In the voltage-sensitive gating circuit for auxiliary diac 32, the secondary winding 23*s* of the pulse transformer is also connected across the terminals of this diac device. The voltage-sensitive gating circuit further includes a Zener diode 34 in series with silicon unilateral switch 19, primary pulse transformer winding 23*p* and resistor 20. The operation as compared to the FIG. 2 circuit is that Zener diode 34 permits commutating capacitor 17 to charge to higher voltages before actuating the voltage-sensitive gating circuit. Silicon unilateral switch 19 provides isolation for the leakage current of Zener diode 34 before it conducts. When Zener diode 34 does conduct fully, a large voltage is immediately applied to device 19 so that it breaks over and conducts immediately. The pulse generated is coupled across the terminals of auxiliary diac 32 by pulse transformer 23*p*, 23*s*.

In summary, the new monostable multivibrator employing thyristors or other solid-state switching devices as the power-handling devices is characterized by the use of the commutation capacitor voltage for the fundamental timing function. The cost advantages of an inherently simple circuit, one power-switching device, zero standby current, and efficient operation with inductive as well as resistive loads make the circuit suitable for a variety of applications in both the pulse width and frequency techniques of power control.

While the invention has been particularly shown and described with reference to a particular preferred embodiment thereof, it will be understood by those skilled in the art that the foregoing and other changes in form and details may be made therein without departing from the spirit and scope of the invention.

What we claim as new and desire to secure by Letters Patent of the United States is:

1. A monostable multivibrator comprising
a load current carrying solid-state switching device adapted to be connected in series circuit relationship with a load between a pair of power supply terminals, and an auxiliary solid-state switching device and a resistive element also connected in series circuit relationship between said power supply terminals,
a dual function commutating and timing capacitor connected between similar terminals of said solid-state switching devices, simultaneously charging
means for rendering conductive said load current carrying solid-state switching device at desired intervals to supply load current while simultaneously charging said commutating and timing capacitor, and
voltage-sensitive gating means actuated by the charging of said commutating and timing capacitor to a predetermined voltage for rendering conductive said auxiliary solid-state switching device after a predetermined time delay dependent on the time constant of the series circuit comprising said resistive element and commutating and timing capacitor, to thereby initiate commutation of said load current carrying solid-state switching device.

2. A monostable multivibrator comprising
a load current carrying solid-state switching device adapted to be connected in series circuit relationship with a load between a pair of power supply terminals, a commutating capacitor connected to the junction therebetween and to the junction of an auxiliary solid-state switching device and a resistor also connected in series circuit relationship between said power supply terminals, and pulse-generating means for rendering conductive said load current carrying solid-state switching device at desired intervals to supply load current while simultaneously charging said commutating capacitor, characterized by
voltage-sensitive gating means responsive to the voltage across said commutating capacitor for rendering conductive said auxiliary solid-state switching device after a predetermined time delay to thereby initiate commutation of said load current carrying solid-state switching device,
said voltage-sensitive gating means comprising a resistor connected in series with a voltage-sensitive breakover switching device and effectively connected across the terminals of said commutating capacitor, and
means for coupling to said auxiliary solid-state switching device the gating signal generated when the voltage across said charging commutating capacitor exceeds a value related to the switching voltage of said voltage-sensitive breakover switching device.

3. A circuit according to claim 2 wherein said voltage-sensitive breakover switching device is a silicon unilateral switch.

4. A monostable multivibrator comprising
a load current carrying solid-state switching device adapted to be connected in series current relationship with a load between a pair of power supply terminals, a commutating capacitor connected to the junction therebetween and to the junction of an auxiliary solid-state switching device and a resistor also connected in series circuit relationship between said power supply terminals, and pulse-generating means for rendering conductive said load current carrying solid-state switching device at desired intervals to supply load current while simultaneously charging said commutating capacitor, characterized by
voltage-sensitive gating means responsive to the voltage across said commutating capacitor for rendering conductive said auxiliary solid-state switching device after a predtermined time delay to thereby initiate commutation of said load current carrying solid-state switching device,
wherein said load current carrying and auxiliary solid-state switching device both comprise power gate controlled thyristors, and said voltage-sensitive gating means comprises a solid-state voltage-sensitive breakover switching device and a resistor connected in series directly across the terminals of said commutating capacitor, and a coupling capacitor connected between the gate electrode of said auxiliary solid-state switching device and the junction of said resistor and voltage-sensitive breakover switching device.

5. A monostable multivibrator comprising a load current carrying solid-state switching device adapted to be connected in series circuit relationship with a load between a pair of power supply terminals, a commutating capacitor connected to the junction therebetween and to the junction of an auxiliary solid-state switching device and a resistor also connected in series circuit relationship between said power supply terminals, and pulse-generating means for rendering conductive said load current carrying solid-state switching device at desired intervals to supply load current while simultaneously charging said commutating capacitor, characterized by voltage-sensitive gating means responsive to the voltage across said commutating capacitor for rendering conductive said auxiliary solid-state switching device after a predetermined time delay to thereby initiate commutation of said load current carrying solid-state switching device, wherein said load current carrying and auxiliary solid-state switching devices both are thyristors, and said voltage-sensitive gating means comprises a solid-state voltage-sensitive breakover switching device and the primary winding of a pulse transformer connected in series across the terminals of said commutating capacitor, said pulse transformer having an inductively coupled secondary winding coupled to 11 auxiliary switching device.

6. A circuit according to claim 6 wherein said voltage-sensitive gating circuit further includes a Zener diode connected in series with said voltage-sensitive breakover switching device and pulse transformer primary winding.

7. A monostable multivibrator comprising a load current carrying solid-state switching device adapted to be connected in series circuit relationship with a load between a pair of power supply terminals, a commutating capacitor connected to the junction therebetween and to the junction of an auxiliary solid-state switching device and a resistor also connected in series circuit relationship between said power supply terminals, and pulse-generating means for rendering conductive said load current carrying solid-state switching device at desired intervals to supply load current while simultaneously charging said commutating capacitor, characterized by voltage-sensitive gating means responsive to the voltage across said commutating capacitor for rendering conductive said auxiliary solid-state switching device after a predetermined time delay to thereby initiate commutation of said load current carrying solid-state switching device, wherein said load current carrying and auxiliary solid-state switching devices both are thyristors, and said voltage-sensitive gating means comprises an anode-gated solid-state switching device, a current-limiting resistor connected to one terminal of said commutating capacitor and to the anode of said anode-gated switching device a resistive voltage divider connected between one of said power supply terminals and to the junction of said load and load current carrying thyristor device, said voltage divider also being connected to the anode-gate of said anode-gated switching device to establish a reference voltage, and means for coupling to said auxiliary thyristor the gating pulse generated when the voltage across said charging commutating capacitor exceeds a predetermined voltage and renders conductive said anode-gated switching device.